(12) United States Patent
Lin

(10) Patent No.: US 8,919,895 B2
(45) Date of Patent: Dec. 30, 2014

(54) CARRIER DEVICE AND SUPPORTING ELEMENT THEREOF

(71) Applicants: Inventec (Pudong) Technology Corporation, Shanghai (CN); Inventec Corporation, Taipei (TW)

(72) Inventor: Ling-Er Lin, Taipei (TW)

(73) Assignees: Inventec (Pudong) Technology Corporation, Shanghai (CN); Inventec Corporation, Taipei (TW)

( * ) Notice: Subject to any disclaimer, the term of this patent is extended or adjusted under 35 U.S.C. 154(b) by 28 days.

(21) Appl. No.: 13/788,901

(22) Filed: Mar. 7, 2013

(65) Prior Publication Data

US 2014/0117829 A1 May 1, 2014

(30) Foreign Application Priority Data

Oct. 26, 2012 (CN) .......................... 2012 1 0416958

(51) Int. Cl.
H05K 5/00 (2006.01)
F16F 15/00 (2006.01)
G11B 33/12 (2006.01)

(52) U.S. Cl.
CPC .............. *F16F 15/00* (2013.01); *G11B 33/124* (2013.01)
USPC ..................................... 312/223.2

(58) Field of Classification Search
CPC ....... G06F 1/181; G06F 1/187; G11B 33/124; G11B 33/128; G11B 33/08; F16F 15/00; H05K 7/183; H05K 7/14
USPC .................... 312/223.2, 333, 334.44–334.47; 361/679.33–679.39
See application file for complete search history.

(56) References Cited

U.S. PATENT DOCUMENTS

| | | | |
|---|---|---|---|
| 6,067,225 A * | 5/2000 | Reznikov et al. | 361/679.31 |
| 6,193,339 B1 * | 2/2001 | Behl et al. | 312/223.2 |
| 6,798,650 B2 * | 9/2004 | Reznikov et al. | 361/679.33 |
| 6,882,526 B2 * | 4/2005 | Neukam et al. | 361/679.39 |
| D556,204 S * | 11/2007 | Tosh et al. | D14/439 |
| 8,023,263 B2 * | 9/2011 | Crippen et al. | 361/679.58 |
| 2005/0128697 A1 * | 6/2005 | Su | 361/685 |
| 2006/0000961 A1 * | 1/2006 | Wei-Chieh et al. | 248/223.41 |
| 2007/0030639 A1 * | 2/2007 | Ko | 361/685 |
| 2009/0031334 A1 * | 1/2009 | Goodman et al. | 720/692 |
| 2010/0039765 A1 * | 2/2010 | Antonuccio et al. | 361/679.34 |
| 2010/0187957 A1 * | 7/2010 | Liang | 312/223.2 |
| 2011/0019357 A1 * | 1/2011 | Lin et al. | 361/679.39 |
| 2011/0043992 A1 * | 2/2011 | Peng et al. | 361/679.31 |
| 2012/0138493 A1 * | 6/2012 | Tung-Ke | 206/320 |
| 2012/0212899 A1 * | 8/2012 | Michael et al. | 361/679.37 |
| 2013/0112633 A1 * | 5/2013 | Chen et al. | 211/26 |

* cited by examiner

*Primary Examiner* — Janet M Wilkens
(74) *Attorney, Agent, or Firm* — Morris Manning & Martin LLP; Tim Tingkang Xia, Esq.

(57) ABSTRACT

A carrier device comprises a rail and a supporting element. The rail includes a first rail element and a second rail element disposed oppositely. The supporting element is slidably disposed between the first rail element and the second rail element along the rail. The supporting element includes a supporting base and a buffer element. The supporting base has a lateral wall. The buffer element has a lateral side as well as a first edge and a second edge disposed oppositely to each other. The buffer element is disposed on the lateral wall with its lateral side facing the lateral wall of the supporting base. The first edge is pressed against the first rail element through a first protruding portion of the first edge. The second edge is pressed against the second rail element. The material stiffness of the buffer element is less than that of the supporting base.

16 Claims, 7 Drawing Sheets

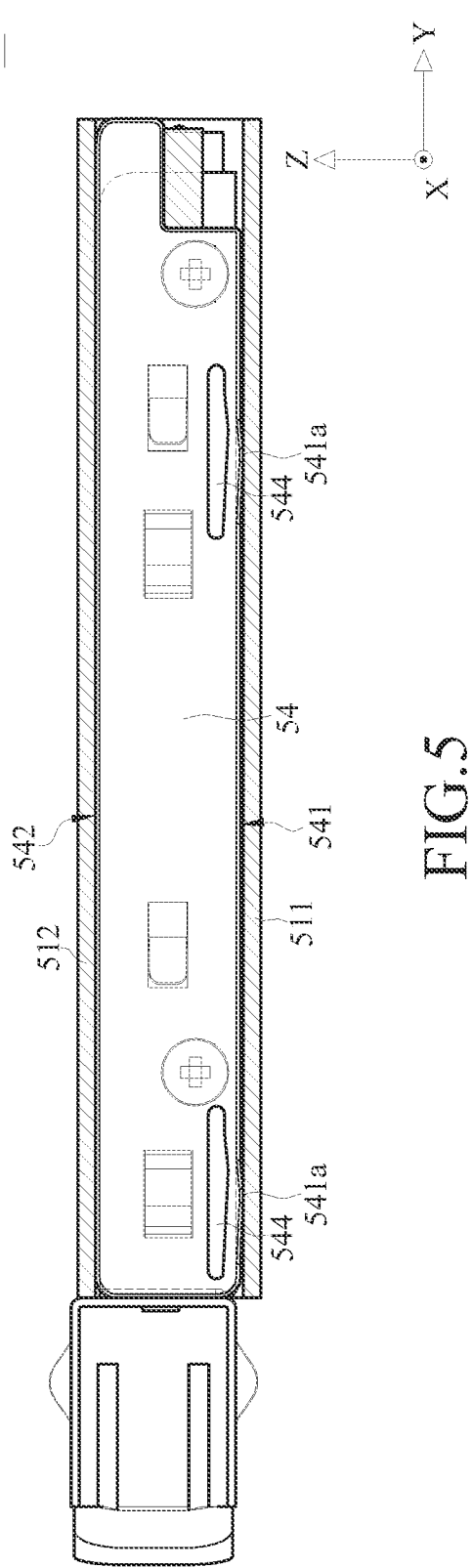
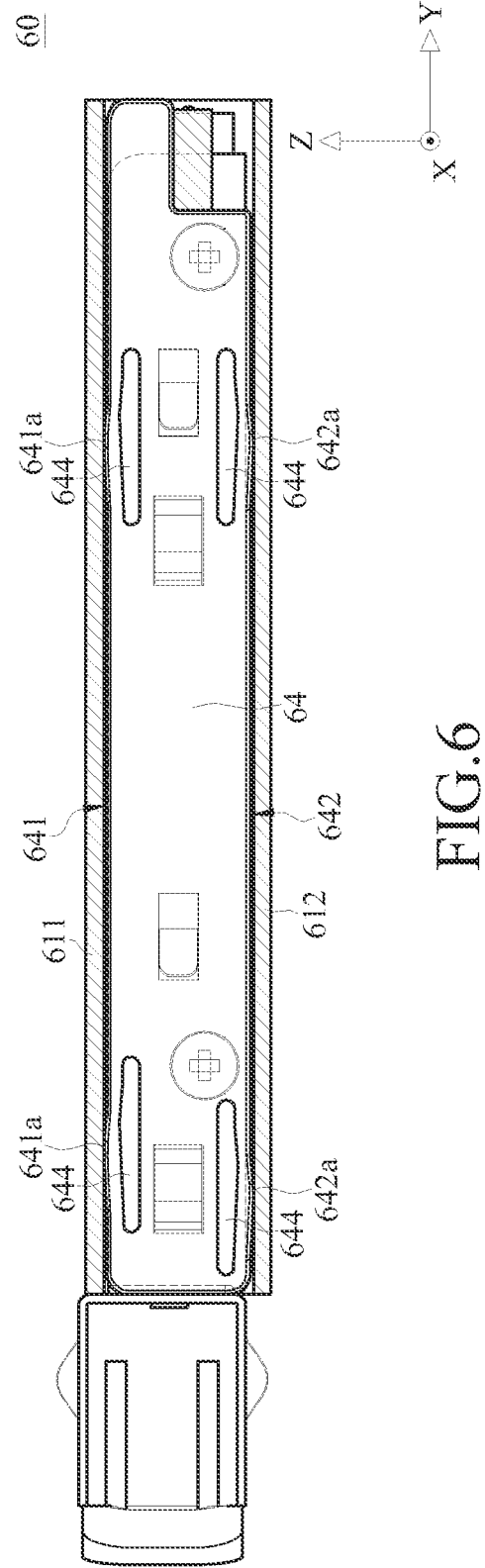
FIG.5
FIG.6

CARRIER DEVICE AND SUPPORTING ELEMENT THEREOF

CROSS-REFERENCE TO RELATED APPLICATIONS

This non-provisional application claims priority under 35 U.S.C. §119(a) on Patent Application No(s). 201210416958.X filed in China, P.R.C. on Oct. 26, 2012, the entire contents of which are hereby incorporated by reference.

BACKGROUND

1. Technical Field

The disclosure relates to a carrier device as well as supporting element thereof, and more particularly to a carrier device and its supporting element having a buffer element.

2. Related Art

Recently, a high rotation speed for a hard disk is demanded to meet the ever-increasing read rate. However, only slight vibration of the hard disk under a high rotation speed will cause friction between a reading head and a disk. This will damage the magnetic sector and reduce the rotation speed of the hard disk supporting.

In a conventional hard disk enclosure, a metal rail is disposed inside a metal case and a metal supporting base is used to support the hard disk. Then, the supporting base is accommodated inside the case along the rail. In such a structural design, when the case of the hard disk enclosure is impacted by an external force, the vibration, caused by the external impact, is directly transmitted to the supporting base through the rail, and then, the vibration is transmitted to the hard disk. Consequently, the hard disk rotation speed is reduced easily and even the magnetic sector is damaged permanently. Furthermore, the impact between the rail and the supporting base may cause resonance and produce noise easily because both of them are made of metal.

SUMMARY

This disclosure provides a carrier device comprising a rail and a supporting element. The rail has a first rail element and a second rail element disposed oppositely to each other. The supporting element is slidably disposed between the first rail element and the second rail element along the rail. The supporting element comprises a supporting base and a buffer element. The supporting base has a lateral wall. The buffer element has a lateral side, as well as a first edge and a second edge disposed oppositely to each other. The buffer element is disposed on the lateral wall, and the lateral side faces the lateral wall. The first edge of the buffer element comprises a first protruding portion and the first edge is pressed against the first rail element through the first protruding portion. The second edge of the buffer element is pressed against the second rail element. Further, the material stiffness of the buffer element is less than the material stiffness of the supporting base.

Moreover, a supporting element adapted to be slidably disposed between a first rail element and a second rail element is provided. The supporting element comprises a supporting base and a buffer element. The buffer element has a lateral side, as well as a first edge and a second edge disposed oppositely to each other. The buffer element is disposed on the lateral wall, and the lateral side faces the lateral wall. The first edge of the buffer element comprises a first protruding portion and the first edge is pressed against the first rail element through the first protruding portion. The second edge of the buffer element is pressed against the second rail element. Further, the material stiffness of the buffer element is less than the material stiffness of the supporting base.

BRIEF DESCRIPTION OF THE DRAWINGS

The disclosure will become more fully understood from the detailed description given herein below for illustration only, and thus is not limitative of the disclosure, and wherein:

FIG. 5 is a sectional view of the carrier device according to another embodiment of the disclosure; and FIG. 6 is a sectional view of the carrier device according to another embodiment of the disclosure.

DETAILED DESCRIPTION

The detailed characteristics and advantages of the disclosure are described in the following embodiments in detail, the techniques of the disclosure can be easily understood and embodied by a person skilled in the art, and the related objects and advantages of the disclosure can be easily understood by a person skilled in the art by referring to the contents, the claims and the accompanying drawings disclosed in the specifications.

Figure 1:
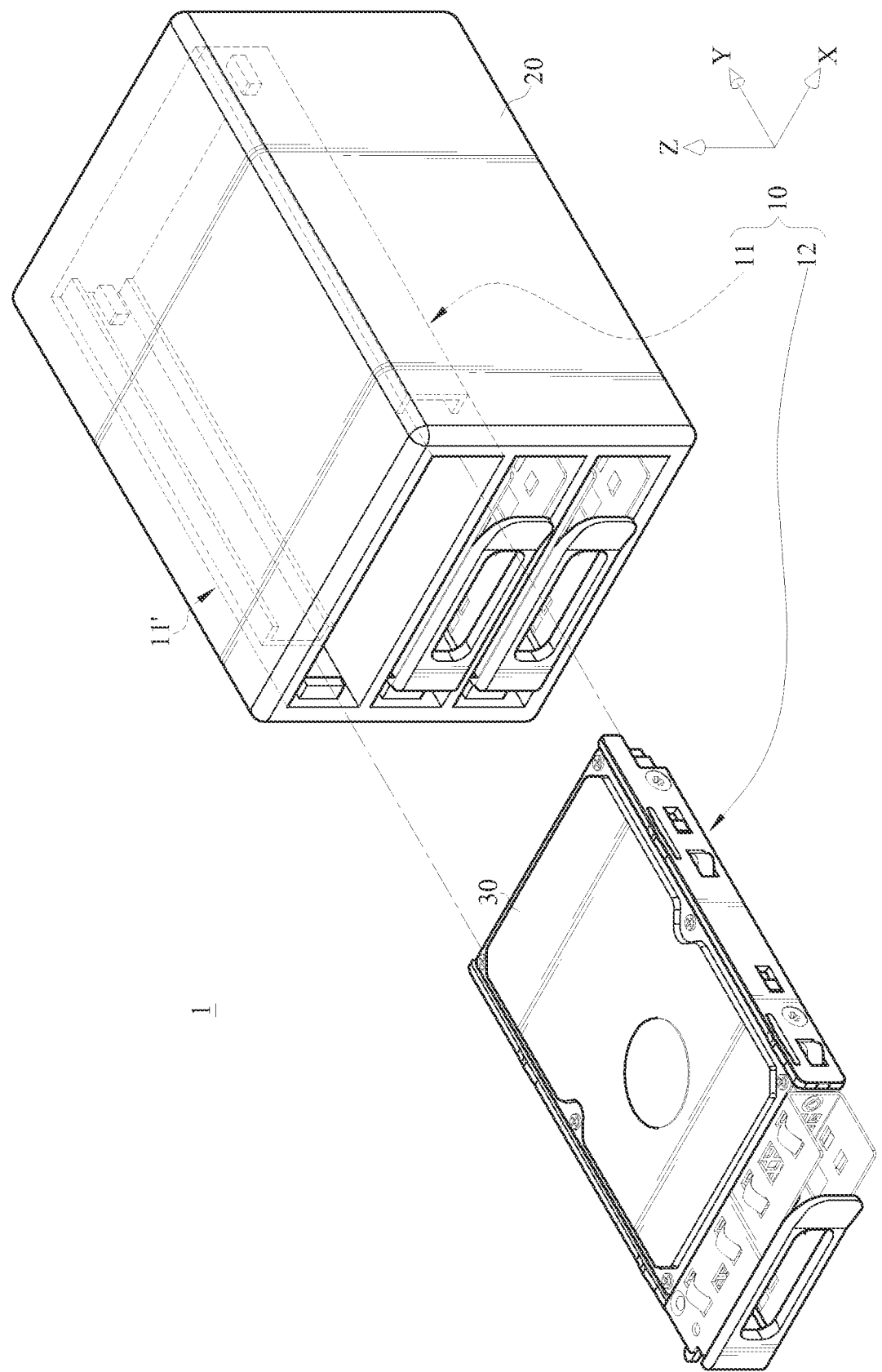
FIG. 1 is an exploded perspective view of a hard disk enclosure of a carrier device according to one embodiment of the disclosure.

Please refer to FIG. 1. FIG. 1 is an exploded perspective view of a hard disk enclosure 1 of a carrier device 10, according to one embodiment of the disclosure. The carrier device 10 comprises a pair of rails 11 and 11' as well as a supporting element 12. The rails 11 and 11' are disposed inside a case 20. In this embodiment, the case 20 may accommodate a plurality of the carrier devices 10. A hard disk 30 may be accommodated in the supporting element 12 of the carrier device 10 from the positive Z direction of the carrier device 10.

Figure 2:
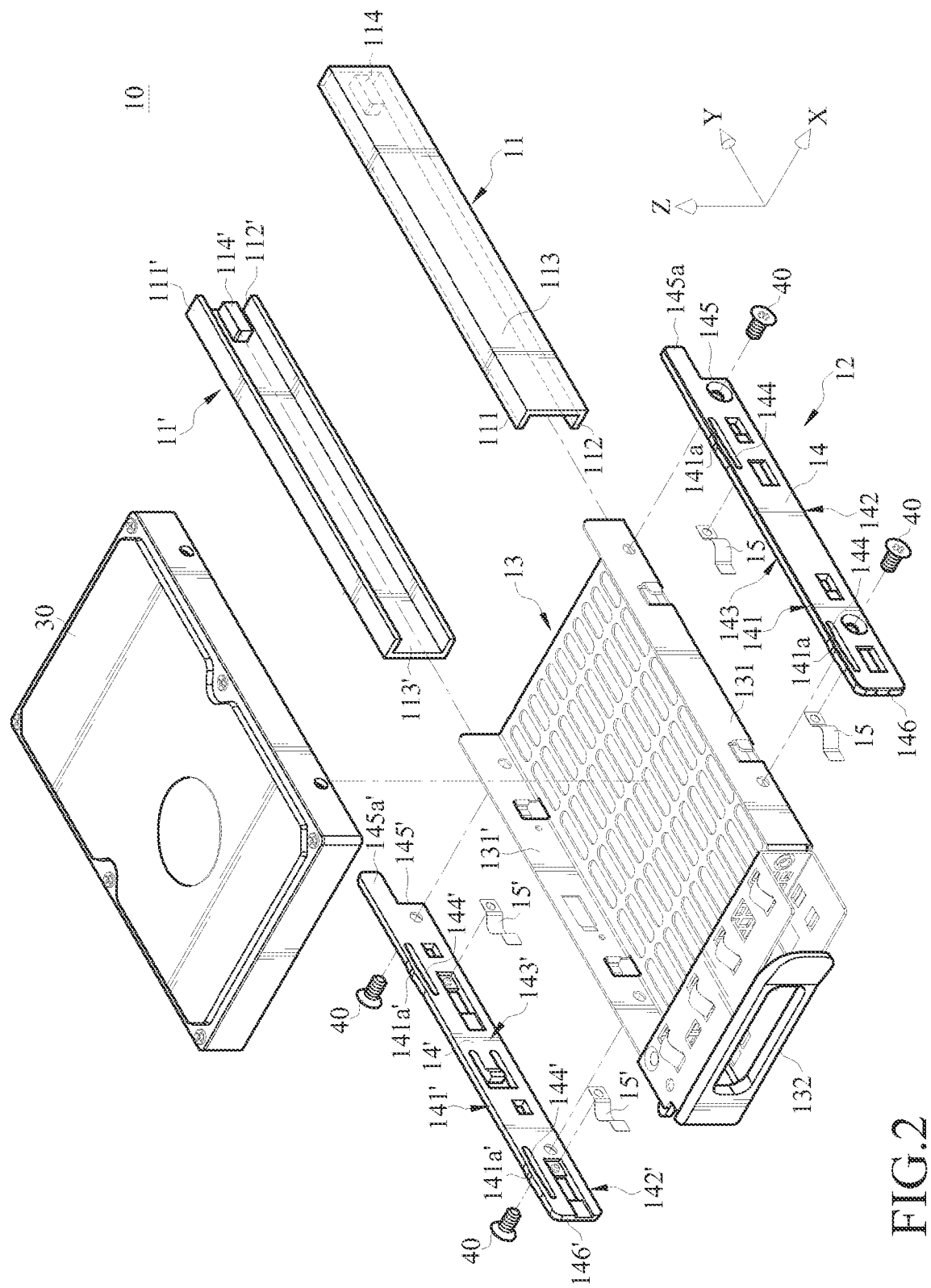
FIG. 2 is an exploded perspective view of the carrier device according to one embodiment of the disclosure.
Figure 3:
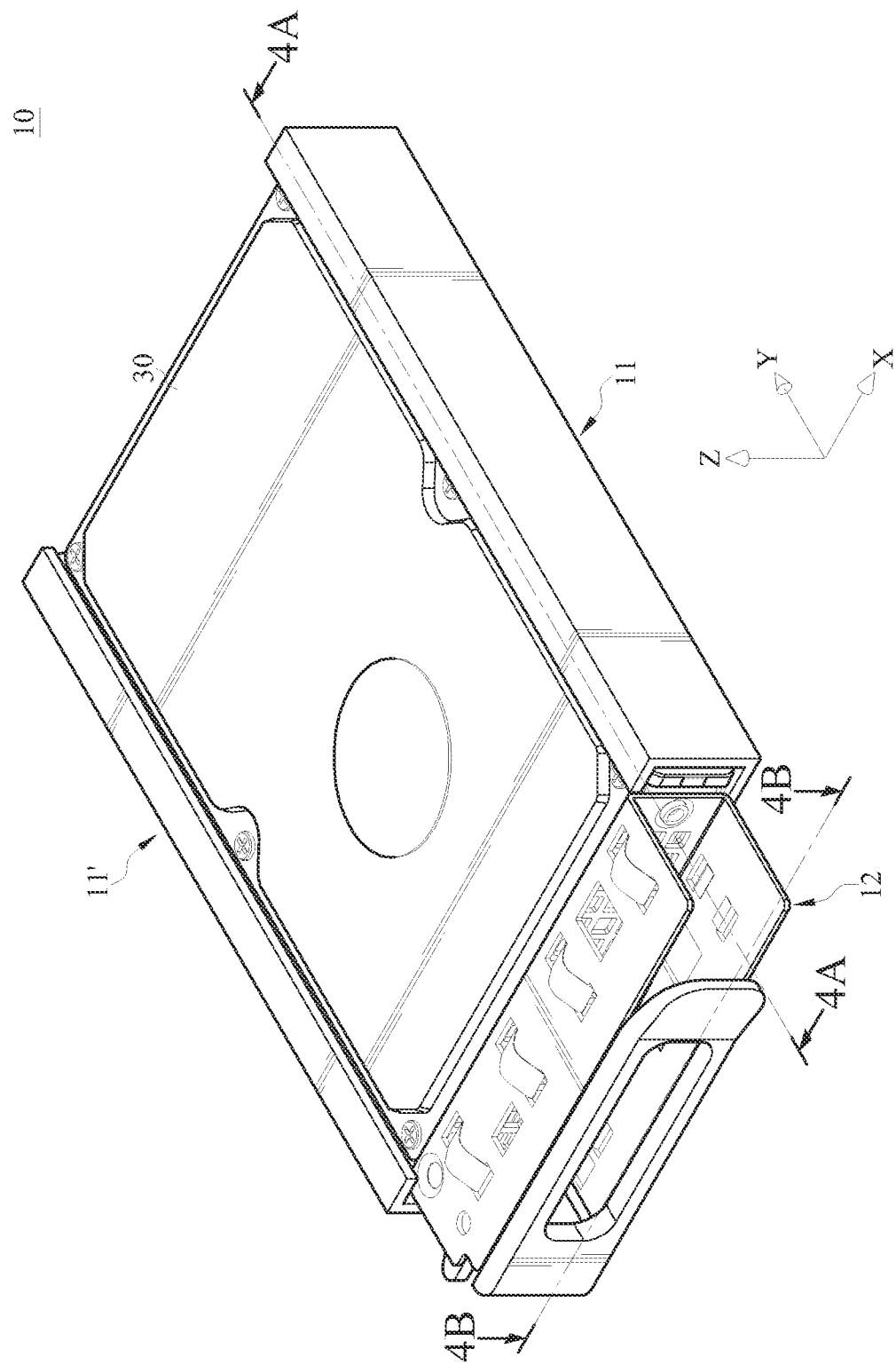
FIG. 3 is a perspective view of an assembly of the carrier device in FIG. 2.

Please refer to FIGS. 2 and 3. FIG. 2 is an exploded perspective view of the carrier device 10 according to one embodiment of the disclosure. FIG. 3 is a perspective view of an assembly of the carrier device 10 in FIG. 2. The rails 11 and 11' respectively comprise first rail elements 111 and 111' disposed oppositely to each other and second rail elements 112 and 112' disposed oppositely to each other. In this embodiment, the first rail element 111 and the first rail element 111' are separated from each other, and the second rail element 112 and the second rail element 112' are separated from each other. In other embodiments, the first rail element 111 may be extended toward the first rail element 111' and connected with the first rail element 111' as well as the second rail element 112 is also extended toward the second rail element 112' and connected with the second rail element 112'. Therefore, the rails 11 and 11' together form a rectangular tube structure according to other embodiments. In this embodiment, the rails 11 and 11', of each of the carrier devices 10, have the first rail elements 111 and 111' as well as the second rail elements 112 and 112' respectively. In other embodiments, when the carrier devices 10 are disposed sequentially, the second rail elements 112 and 112', of the first carrier device 10, may also be used as the first rail elements 111 and 111' for the second carrier device 10 at the same time.

In this embodiment, the supporting element 12 is slidably disposed between the first rail element 111 and the second rail element 112 along the rail 11, and is slidably disposed between the first rail element 111' and the second rail element 112' along the rail 11'. The supporting element 12 comprises a supporting base 13 and a pair of buffer elements 14 and 14'. The material stiffness of the buffer elements 14 and 14' is less than the material stiffness of the supporting base 13. The supporting base 13 has a pair of lateral walls 131 and 131'. The buffer elements 14 and 14' have lateral sides 143 and 143' respectively. The lateral side 143 of the buffer element 14 faces toward the negative X direction. The buffer element 14 is disposed on the lateral wall 131, and the lateral side 143 of the buffer element 14 faces the lateral wall 131. In addition, the lateral side 143' of the buffer element 14' faces toward the positive X direction. The buffer element 14' is disposed on the lateral wall 131', and the lateral side 143' of the buffer element 14' faces the lateral wall 131'.

The buffer element 14 has a first edge 141 and a second edge 142 disposed oppositely to each other. The first edge 141 faces toward the positive Z direction and the second edge 142 faces toward the negative Z direction. The first rail element 111 is disposed in the positive Z direction right above the second rail element 112. The first edge 141 comprises two first protruding portions 141a. The buffer element 14 has two through holes 144. The number of the first protruding portions 141a equals to the number of the through holes 144. The two through holes 144 are disposed on the two first protruding portions 141a respectively and are kept away from the first edge 141 at a distance. When the first protruding portions 141a receive vibration, the through holes 144 may provide space for the deforming of the first protruding portions 141a in order to buffer the vibration received by the first protruding portions 141a. In this embodiment, the number of the first protruding portions 141a and the through holes 144 is two, but it should not be construed as a limitation to the disclosure. In other embodiments, the number of the first protruding portions 141a and the through holes 144 may be one or more than three.

The buffer element 14' has a first edge 141' and a second edge 142' disposed oppositely to each other. The first edge 141' faces toward the positive Z direction and the second edge 142' faces toward the negative Z direction. The first rail element 111' is disposed in the Z direction (including both the positive Z direction and the negative Z direction, the X direction and the Y direction may be regarded in the same manner) right above the second rail element 112'. The first edge 141' comprises two first protruding portions 141a'. The buffer element 14' has two through holes 144'. The number of the first protruding portions 141a' equals to the number of the through holes 144'. The two through holes 144' are disposed on the two first protruding portions 141a' respectively and are kept away from the first edge 141' at a distance. When the first protruding portions 141a' receive vibration, the through holes 144' may provide space for the deforming of the first protruding portions 141a' in order to buffer the vibration received by the first protruding portions 141a'. In this embodiment, the number of the first protruding portions 141a' and the through holes 144' is two, but it should not be construed as a limitation to the disclosure. In other embodiments, the number of the first protruding portions 141a' and the through holes 144' may be one or more than three.

In this embodiment, the rail 11 comprises a connecting wall 113 disposed between the first rail element 111 and the second rail element 112, and the connecting wall 113 may be separated from the case 20 in FIG. 1. In other embodiments, the connecting wall 113 may be connected with the case 20 in FIG. 1. The supporting element 12 further comprises two elastic plates 15. From the lateral wall 131 toward the connecting wall 113, the elastic plates 15 are protruded out of the buffer element 14, which make the elastic plates 15 to protrude toward the X direction. In this embodiment, between the lateral wall 131 and the buffer element 14, the elastic plates 15 are penetrated through the buffer element 14 and protruded from the buffer element 14. But it should not be construed as a limitation to the disclosure. In other embodiments, the elastic plates 15 may also be inlaid into the buffer element 14 and protruded from the buffer element 14. In this embodiment, the number of the elastic plates 15 is two, but it should not be construed as a limitation to the disclosure. In other embodiments, the number of the elastic plates 15 may be one or more than three. The elastic plates 15 can be disposed into the buffer element 14 by employing tenon, heat fusion or locking.

In this embodiment, the rail 11' comprises a connecting wall 113' is disposed between the first rail element 111' and the second rail element 112', and the connecting wall 113' may be separated from the case 20 in FIG. 1. In other embodiments, the connecting wall 113' may be connected with the case 20 in FIG. 1. The supporting element 12 further comprises two elastic plates 15'. From the lateral wall 131' toward the connecting wall 113', the elastic plates 15' are protruded out of the buffer element 14', which make the elastic plates 15' to protrude toward the negative X direction. In this embodiment, between the lateral wall 131' and the buffer element 14', the elastic plates 15' are penetrated through the buffer element 14' and protruded from the buffer element 14'. But it should not be construed as a limitation to the disclosure. In other embodiments, the elastic plates 15' may also be inlaid into the buffer element 14' and protruded from the buffer element 14'. In this embodiment, the number of the elastic plates 15' is two, but it should not be construed as a limitation to the disclosure. In other embodiments, the number of the elastic plates 15' may be one or more than three. The elastic plates 15' may be disposed into the buffer element 14' by employing tenon, heat fusion or other methods.

In this embodiment, the buffer element 14 has two ends 145 and 146 disposed oppositely to each other. The lateral side 143, the first edge 141 and the second edge 142 are disposed between the two ends 145 and 146. The end 145 faces toward the positive Y direction and the end 146 faces toward the negative Y direction. A pressing portion 114 is disposed at an end of the rail 11. The end 145 may be adapted to being pressed against the pressing portion 114. The end 145 of the buffer element 14 relatively closer to the pressing portion 114 has a protruded piece 145a. The protruded piece 145a is protruded towards the pressing portion 114 and is adapted to press against the pressing portion 114.

In this embodiment, the buffer element 14' has two ends 145' and 146' disposed oppositely to each other. The lateral side 143', the first edge 141' and the second edge 142' are disposed between the two ends 145' and 146'. The end 145' faces toward the positive Y direction and the end 146' faces toward the negative Y direction. A pressing portion 114' is disposed at an end of the rail 11'. The end 145' may be adapted to being pressed against the pressing portion 114'. The end 145' of the buffer element 14' relatively closer to the pressing portion 114' has a protruded piece 145a'. The protruded piece 145a' is protruded towards the pressing portion 114' and is adapted to press against the pressing portion 114'.

The supporting element 12 comprises a handle 132. The handle 132 is disposed on the supporting base 13 and is away from the pressing portions 114 and 114'. The handle 132 may be affixed to the carrier device 10 in the case 20 in FIG. 1. Multiple screws 40 penetrates through the buffer elements 14 and 14' as well as the lateral walls 131 and 131' in order to be affixed to the hard disk 30 between the lateral walls 131 and 131' of the supporting base 13.

Figure 4A:
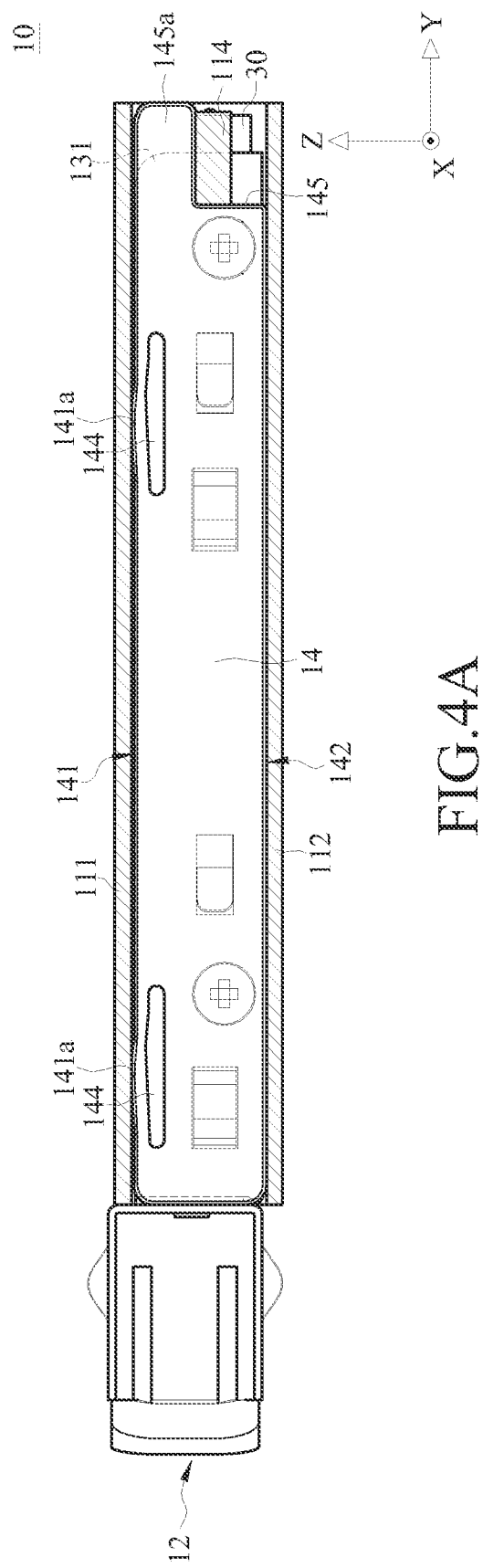
FIG. 4A is a sectional view of FIG. 3 along a line 4A-4A.

Please refer to FIG. 4A. FIG. 4A is a sectional view of FIG. 3 along a line 4A-4A. The first protruding portions 141a of the first edge 141 are protruded beyond the lateral wall 131. The second edge 142 is also protruded beyond the lateral wall 131. When the supporting element 12 is disposed in the first rail element 111 and the second rail element 112, the first edge 141 is pressed against the first rail element 111 through the first protruding portions 141a, and the second edge 142 is pressed against the second rail element 112. The protruded piece 145a of the end 145 is protruded beyond the lateral wall 131. When the supporting element 12 is disposed in the first rail element 111 and the second rail element 112, the end 145 and the protruded piece 145a may be pressed against the pressing portion 114. In other embodiments, when the width of the second rail element 112 along the positive X direction is extended from the second edge 142 but not yet reached the supporting base 13, the second edge 142 may still be pressed against the second rail element 112 without protruding beyond the lateral wall 131.

When the first protruding portions 141a are pressed against the first rail element 111, the through holes 144 provides space for the slight deforming of the first protruding portions 141a. When vibration occurs in the first rail element 111, the deforming of the first protruding portions 141a may absorb the vibration in the Z direction. Therefore, the vibration in the Z direction may be prevented from transmitting to the lateral wall 131 from the buffer element 14, and further preventing the vibration from transmitting to the hard disk 30. When the supporting element 12 is disposed in the first rail element 111 and the second rail element 112 and if vibration occurs in the pressing portion 114, the buffer element 14 with relatively lesser stiffness may absorb the vibration in the Y direction because the end 145 and the protruded piece 145a are pressed against the pressing portion 114. Therefore, the vibration in the Y direction may be prevented from transmitting to the lateral wall 131 and further preventing the vibration from transmitting to the hard disk 30.

Figure 4B:
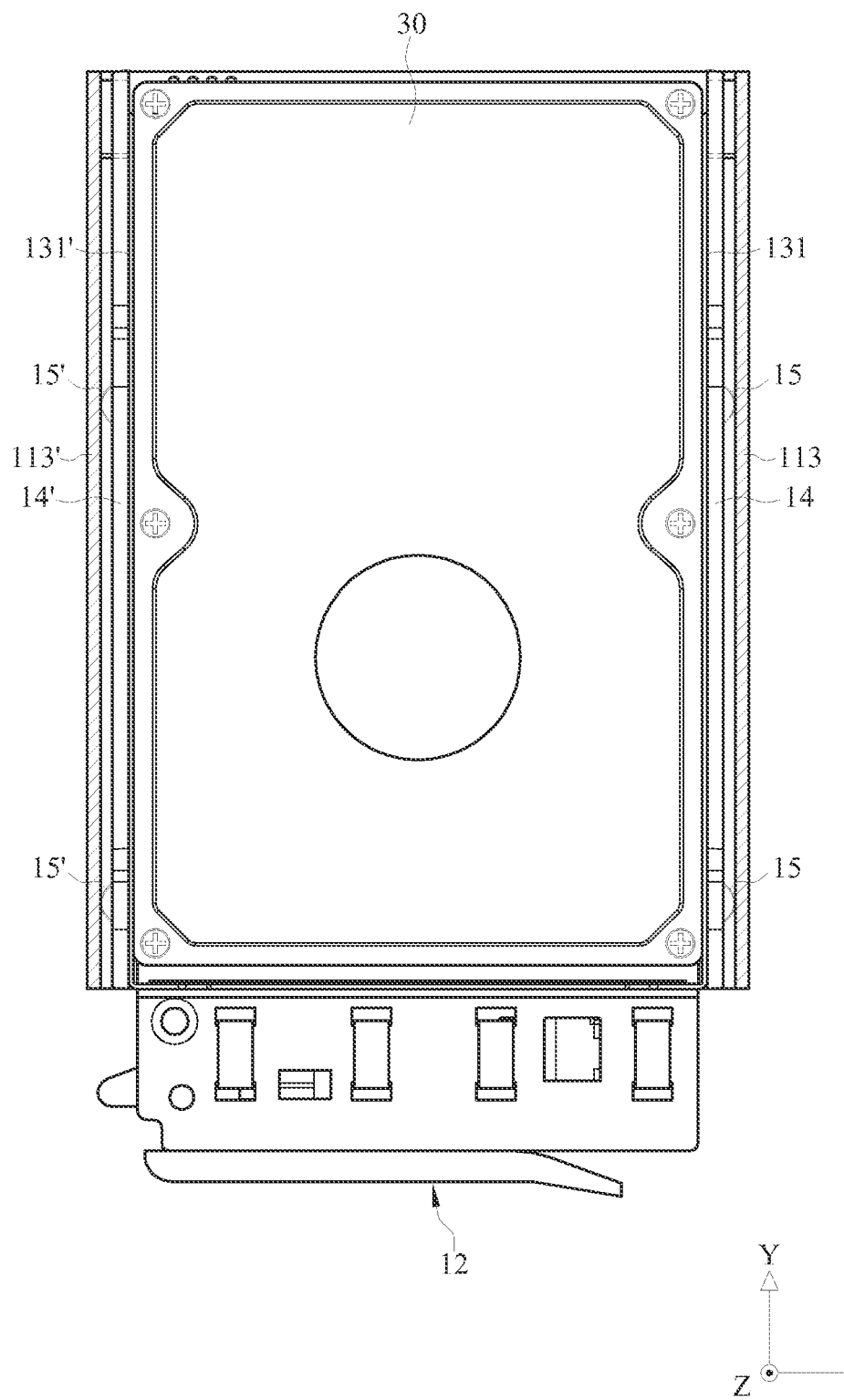
FIG. 4B is a sectional view of FIG. 3 along a line 4B-4B.

Please refer to FIG. 4B. FIG. 4B is a sectional view of FIG. 3 along a line 4B-4B. The lateral walls 131 and 131', the elastic plates 15 and 15' as well as the connecting walls 113 and 113' may be made of conductive materials. The elastic plates 15 and 15' may be protruded out of the buffer elements 14 and 14' from the lateral walls 131 and 131' toward the connecting walls 113 and 113' respectively, and may be pressed against the connecting walls 113 and 113' respectively. When the elastic plates 15 and 15' are pressed against the connecting walls 113 and 113', the lateral wall 131, the elastic plates 15 and the connecting wall 113 may be electrically connected to each other; and the lateral wall 131', the elastic plates 15' and the connecting wall 113' may be electrically connected to each other; and the operation of the hard disk 30 may be prevented from interfering by static electricity. Furthermore, when vibration occurs in the connecting walls 113 and 113', the elastic plates 15 and 15' may absorb the vibration in the X direction because the elastic plates 15 and 15' may be pressed against the connecting walls 113 and 113' respectively. Therefore, the vibration in the X direction may be prevented from transmitting to the lateral walls 131 and 131' and further preventing the vibration from transmitting to the hard disk 30.

Figure 4C:
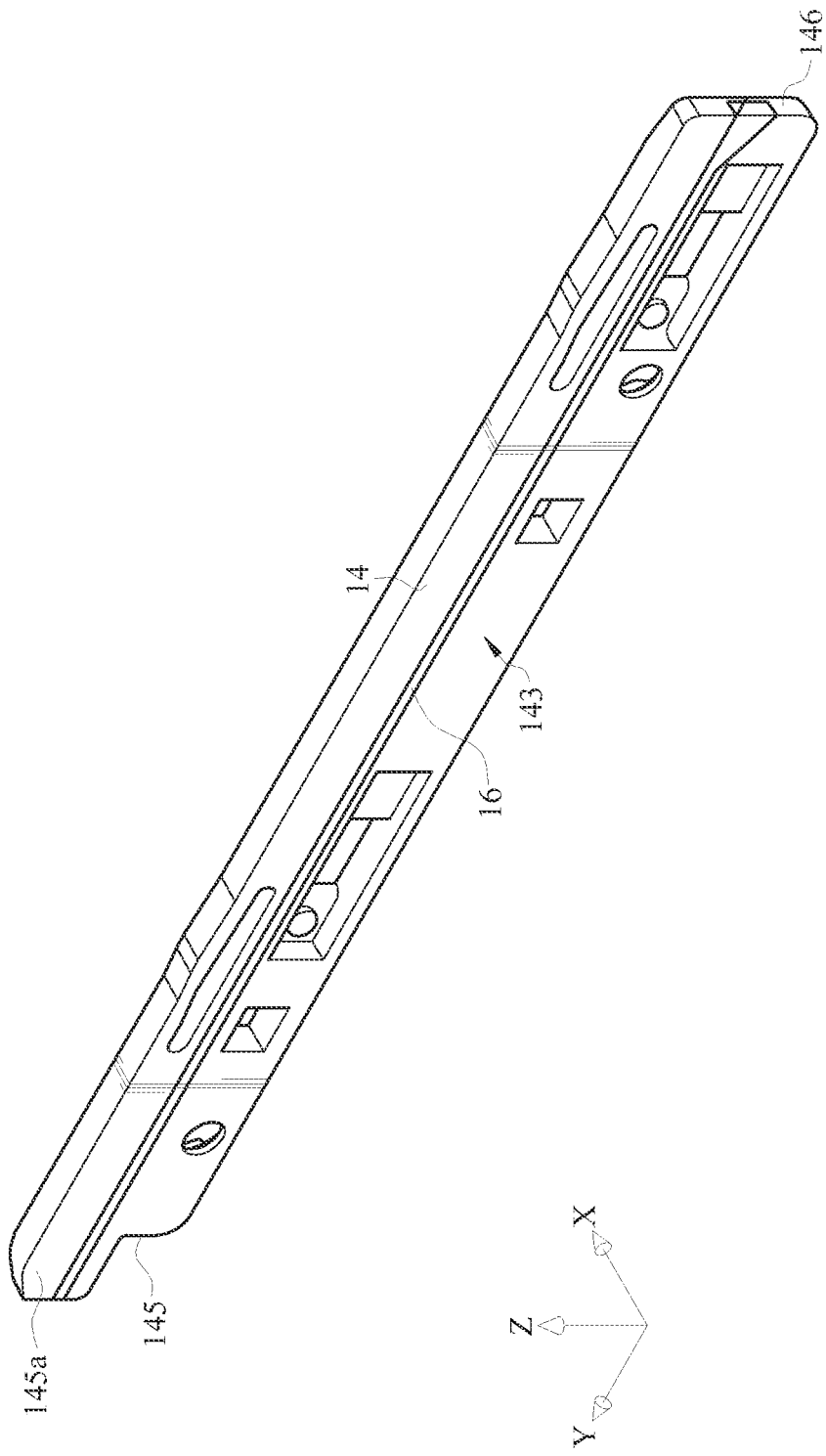
FIG. 4C is a perspective view of a buffer element in FIG. 2.

Please refer to FIG. 4C, which is a perspective view of the buffer element 14 in FIG. 2 being viewed from another angle.

The supporting element 12 in FIG. 3 further comprises a light guide device 16. The light guide device 16 is inlaid into the lateral side 143 of the buffer element 14. The light guide device 16 is extended from the protruded piece 145a of the end 145 to the end 146. The supporting base 13 in FIG. 2 covers a part of the lateral side 143 of the buffer element 14, and exposes a part of the light guide device 16 on the protruded piece 145a. Furthermore, the light guide device 16 is also exposed on the end 146. A hard disk status indication light (not shown in the drawings) is disposed inside the hard disk enclosure 1 in FIG. 1 and is adapted for indicating the status of the hard disk 30 as shown in FIG. 1. The hard disk status indication light may irradiate a hard disk status light on a part of the light guide device 16 on the protruded piece 145a, and the hard disk status light may be directed to the end 146 by the light guide device 16. Thereby, users can know the current status of the hard disk 30 (as shown in FIG. 1) by observing the hard disk status light directed to the end 146 by the light guide device 16.

Please refer to FIG. 5, which is a sectional view of a carrier device 50 according to another embodiment of the disclosure. In this embodiment, a buffer element 54 has a first edge 541 and a second edge 542 disposed oppositely to each other. The first edge 541 faces toward the negative Z direction and the second edge 542 faces toward the positive Z direction. A second rail element 512 is disposed in the positive Z direction right above a first rail element 511. The first edge 541 comprises two first protruding portions 541a. The buffer element 54 has two through holes 544. The two through holes 544 are disposed on the two first protruding portions 541a respectively and are kept away from the first edge 541 at a distance. In this embodiment, the number of the first protruding portions 541a and the through holes 544 is two. But it should not be construed as a limitation to the disclosure. In other embodiments, the number of the first protruding portions 541a and the through holes 544 may be one or more than three.

FIG. 6 is a sectional view of a carrier device 60 according to another embodiment of the disclosure. In this embodiment, a buffer element 64 has a first edge 641 and a second edge 642 disposed oppositely to each other. The first edge 641 faces toward the positive Z direction and the second edge 642 faces toward the negative Z direction. A first rail element 611 is disposed in the positive Z direction right above a second rail element 612. The first edge 641 comprises two first protruding portions 641a. The second edge 642 comprises two second protruding portions 642a. The second edge 642 is pressed against the second rail element 612 through the two second protruding portions 642a. The buffer element 64 has four through holes 644. The four through holes 644 are disposed on the two first protruding portions 641a and the two second protruding portions 642a respectively and are kept away from the first edge 641 and the second edge 642 at a distance respectively. In this embodiment, the number of the first protruding portions 641a and the second protruding portions 642a is two, but it should not be construed as a limitation to the disclosure. In other embodiments, the number of the first protruding portions 641a and the second protruding portions 642a can be one or more than two. The number of the through holes 644 can equal to the sum of the first protruding portions 641a and the second protruding portions 642a.

According to the carrier device and its supporting element of the disclosure, the vibration in the rail can be prevented from transmitting to the supporting base by the buffering of the buffer element with relatively smaller stiffness. Furthermore, by using the first edge and the second edge to respectively press against the first rail element and the second rail element, the supporting element may be prevented from swaying between the first rail element and the second rail element in the Z direction, and the supporting base may be further prevented from producing vibration. The vibration in the Z direction may be prevented from transmitting to the supporting base by the deforming of the protruding portions and the through holes. The supporting base may be prevented from swaying in the X direction by having the elastic plates pressing against the connecting walls, and the vibration in the x direction may be prevented from transmitting to the supporting base. The supporting base can be prevented from swaying in the Y direction by having the protruded pieces of the ends pressing against the pressing portions, and the vibration in the Y direction can be prevented from transmitting to the supporting base. The hard disk can be prevented from swaying and affecting by external impact easily by using the afore-mentioned vibration preventing functions performed in the various directions. Furthermore, because the supporting element may be prevented from swaying between the rail elements, the impact between the supporting element and the rail may be prevented, and therefore noise produced by the impact may be prevented.

Note that the specifications relating to the above embodiments should be construed as exemplary rather than as limitative of the present invention, with many variations and modifications being readily attainable by a person of average skill in the art without departing from the spirit or scope thereof as defined by the appended claims and their legal equivalents.

What is claimed is:

1. A carrier device, comprising:
   a rail comprising a first rail element and a second rail element disposed oppositely to each other, and a pressing portion being disposed at an end of the rail; and
   a supporting element slidably disposed between the first rail element and the second rail element along the rail, the supporting element comprising:
   a supporting base having a lateral wall; and
   a buffer element with two ends having a lateral side as well as a first edge and a second edge disposed oppositely to each other, the two ends being disposed oppositely to each other, the lateral side, the first edge and the second edge being disposed between the two ends, one of the two ends of the buffer element relatively closer to the pressing portion having a protruded piece protruded towards the pressing portion and adapted to be pressed against the pressing portion, the buffer element being disposed on the lateral wall, the lateral side facing the lateral wall, the first edge comprising a first protruding portion, the first edge being pressed against the first rail element through the first protruding portion, the second edge being pressed against the second rail element, the material stiffness of the buffer element being less than the material stiffness of the supporting base;
   wherein, when the supporting element is disposed in the first rail element and the second rail element, one of the two ends of the buffer element relatively closer to the pressing portion is pressed against the pressing portion.

2. The carrier device as claimed in claim 1, wherein the second edge comprises a second protruding portion, the second edge is pressed against the second rail element through the second protruding portion.

3. The carrier device as claimed in claim 1, wherein the buffer element has a through hole, the through hole is disposed on the first protruding portion and is kept away from the first edge at a distance.

4. The carrier device as claimed in claim 1, wherein the second edge is protruded beyond the lateral wall.

5. The carrier device as claimed in claim 1, wherein the first protruding portion is protruded beyond the lateral wall.

6. The carrier device as claimed in claim 1, wherein the rail comprises a connecting wall disposed between the first rail element and the second rail element, the supporting element further comprises an elastic plate, the elastic plate is protruded out of the buffer element from the lateral wall toward the connecting wall and is adapted to being pressed against the connecting wall.

7. The carrier device as claimed in claim 1, wherein the protruded piece is protruded beyond the lateral wall.

8. The carrier device as claimed in claim 1, wherein the supporting element further comprises a handle, and the handle is disposed on the supporting base as well as being away from the pressing portion.

9. A supporting element for being slidably disposed between a first rail element and a second rail element, the supporting element comprising:
   a supporting base having a lateral wall; and
   a buffer element with two ends having a lateral side as well as a first edge and a second edge disposed oppositely to each other, the two ends of the buffer element being disposed oppositely to each other, the lateral side, the first edge and the second edge being disposed between the two ends, the buffer element being disposed on the lateral wall and the lateral side facing the lateral wall, the first edge comprising a first protruding portion, the first edge being pressed against the first rail element through the first protruding portion, the second edge being pressed against the second rail element, and the material stiffness of the buffer element being less than the material stiffness of the supporting base;
   wherein, a pressing portion is disposed at an end of the rail composed of the first rail element and the second rail element, one of the two ends of the buffer element relatively closer to the pressing portion has a protruded piece, the protruded piece is protruded towards the pressing portion and adapted to be pressed against the pressing portion, and when the supporting element is disposed in the first rail element and the second rail element, one of the two ends of the buffer element relatively closer to the pressing portion is pressed against the pressing portion.

10. The supporting element as claimed in claim 9, wherein the second edge comprises a second protruding portion, the second edge is pressed against the second rail element through the second protruding portion.

11. The supporting element as claimed in claim 9, wherein the buffer element has a through hole, the through hole is disposed on the first protruding portion and is kept away from the first edge at a distance.

12. The supporting element as claimed in claim 9, wherein the second edge is protruded beyond the lateral wall.

13. The supporting element as claimed in claim 9, wherein the first protruding portion is protruded beyond the lateral wall.

14. The supporting element as claimed in claim 9, wherein the rail comprises a connecting wall disposed between the first rail element and the second rail element, the supporting element further comprises an elastic plate, the elastic plate is protruded out of the buffer element from the lateral wall toward the connecting wall and is adapted to being pressed against the connecting wall.

15. The supporting element as claimed in claim 9, wherein the protruded piece is protruded beyond the lateral wall.

16. The supporting element as claimed in claim 9, further comprising a handle, the handle being disposed on the supporting base and being further away from the pressing portion.

* * * * *